US012679445B2

(12) United States Patent
Friedel

(10) Patent No.: US 12,679,445 B2
(45) Date of Patent: Jul. 14, 2026

(54) METHOD FOR DECELERATING A SERVOMOTOR OF A STEERING DEVICE

(71) Applicant: Robert Bosch GmbH, Stuttgart (DE)

(72) Inventor: Michael Friedel, Ruppertshofen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 18/757,181

(22) Filed: Jun. 27, 2024

(65) Prior Publication Data

US 2025/0002073 A1     Jan. 2, 2025

(30) Foreign Application Priority Data

Jun. 29, 2023     (DE) ...................... 10 2023 206 141.4

(51) Int. Cl.
B62D 5/04          (2006.01)
(52) U.S. Cl.
CPC ........... B62D 5/046 (2013.01); B62D 5/0481 (2013.01); B62D 5/0487 (2013.01); B62D 5/0469 (2013.01)

(58) Field of Classification Search
None
See application file for complete search history.

(56) References Cited

U.S. PATENT DOCUMENTS

| | | | | |
|---|---|---|---|---|
| 8,401,738 B2 * | 3/2013 | Nakai | .................. | B62D 5/0481 |
| | | | | 701/41 |
| 9,126,620 B2 * | 9/2015 | Sugiyama | ............ | B62D 5/0475 |
| 9,882,522 B2 * | 1/2018 | Kanekawa | .............. | H02P 27/04 |
| 11,063,535 B2 * | 7/2021 | Diez | ..................... | B62D 5/0493 |
| 12,049,262 B2 * | 7/2024 | Satou | .................. | B62D 5/0484 |
| 12,145,665 B2 * | 11/2024 | Satou | .................. | B62D 5/0484 |
| 2011/0071730 A1 * | 3/2011 | Nakai | .................. | B62D 5/0481 |
| | | | | 701/41 |
| 2014/0229066 A1 * | 8/2014 | Harada | ................ | B62D 5/0481 |
| | | | | 701/41 |
| 2015/0008066 A1 * | 1/2015 | Sugiyama | ............ | B62D 5/0475 |
| | | | | 180/443 |

(Continued)

FOREIGN PATENT DOCUMENTS

| | | | | | |
|---|---|---|---|---|---|
| CN | 102030030 A | * | 4/2011 | ........... | B62D 5/0481 |
| CN | 102545739 A | * | 7/2012 | ........... | B62D 5/0481 |

(Continued)

*Primary Examiner* — Kevin R Steckbauer
(74) *Attorney, Agent, or Firm* — Maginot, Moore & Beck LLP

(57)          ABSTRACT

A method is for decelerating a servomotor of a steering device. The steering device includes a control unit for controlling the servomotor, monitoring electronics for monitoring a movement of the servomotor, and an energy store. The energy store has a different configuration from a vehicle battery. The method includes activating the energy store by an external force, and monitoring a movement of the servomotor caused by the external force by evaluating a movement parameter correlated with the movement of the servomotor. The method further includes, in at least one operating state, triggering a deceleration process as a function of the movement parameter, in which deceleration process the servomotor is decelerated using the control unit, the energy store is charged by the movement of the servomotor, and the energy store is used to supply energy to the control unit and the monitoring electronics.

11 Claims, 3 Drawing Sheets

(56)                References Cited

U.S. PATENT DOCUMENTS

| | | | | |
|---|---|---|---|---|
| 2016/0173020 A1* | 6/2016 | Kanekawa | ............. | H02P 27/04 |
| | | | | 318/400.26 |
| 2020/0052489 A1* | 2/2020 | Shinoda | ................... | H02J 1/16 |
| 2021/0083604 A1* | 3/2021 | Diez | ..................... | B62D 5/046 |
| 2023/0001978 A1* | 1/2023 | Satou | .................. | B60R 16/033 |
| 2023/0029564 A1* | 2/2023 | Satou | ............. | G01R 19/16528 |
| 2025/0002073 A1* | 1/2025 | Friedel | ................ | B62D 5/0481 |
| 2025/0187652 A1* | 6/2025 | Kovács | ................. | B62D 5/046 |

FOREIGN PATENT DOCUMENTS

| | | | | | |
|---|---|---|---|---|---|
| CN | 102545739 B | * | 6/2014 | .......... | B62D 5/0481 |
| CN | 102030030 B | * | 10/2014 | .......... | B62D 5/0481 |
| CN | 104276205 A | * | 1/2015 | .......... | B62D 5/0475 |
| CN | 104350570 A | * | 2/2015 | .......... | B62D 5/0481 |
| CN | 103633921 B | * | 10/2017 | ............. | H02M 7/48 |
| CN | 108945089 A | * | 12/2018 | ............. | B62D 5/046 |
| CN | 109334756 A | * | 2/2019 | ............. | H02P 25/18 |
| CN | 110914696 A | * | 3/2020 | .......... | G01R 31/374 |
| CN | 108945089 B | * | 11/2020 | ............. | B62D 5/046 |
| CN | 112511042 A | * | 3/2021 | .......... | B62D 5/0493 |
| CN | 115556688 A | * | 1/2023 | .......... | B60R 16/033 |
| CN | 115675622 A | * | 2/2023 | ....... | G01R 19/16542 |
| DE | 10 2017 218 830 A1 | | 4/2019 | | |
| DE | 102019200091 A1* | | 7/2020 | .......... | B62D 5/0487 |
| DE | 102020123574 A1* | | 3/2021 | .......... | B62D 5/0493 |
| DE | 102019200091 B4* | | 7/2021 | .......... | H02H 1/0007 |
| DE | 102021205208 A1* | | 11/2022 | .......... | B62D 5/0481 |

| | | | | | |
|---|---|---|---|---|---|
| EP | 2301822 A2 | * | 3/2011 | .......... | B62D 5/0481 |
| EP | 2322409 A1 | * | 5/2011 | .......... | B62D 5/0487 |
| EP | 2301822 B1 | * | 5/2013 | .......... | B62D 5/0481 |
| EP | 2322409 B1 | * | 3/2014 | .......... | B62D 5/0487 |
| EP | 2035249 B1 | * | 4/2014 | ............... | B60L 7/10 |
| EP | 2821318 A2 | * | 1/2015 | .......... | B62D 5/0481 |
| EP | 3018037 A1 | * | 5/2016 | .......... | B62D 5/0481 |
| EP | 3029822 A1 | * | 6/2016 | .......... | B62D 5/0484 |
| EP | 2821318 B1 | * | 4/2017 | .......... | B62D 5/0481 |
| EP | 2998200 B1 | * | 11/2018 | .......... | B62D 5/0481 |
| EP | 3029822 B1 | * | 3/2019 | .......... | B62D 5/0484 |
| EP | 3909104 B1 | * | 8/2023 | .......... | B62D 5/0487 |
| FR | 2902709 A1 | * | 12/2007 | ............... | B60L 7/10 |
| JP | H08156810 A | * | 6/1996 | | |
| JP | 3805657 B2 | * | 8/2006 | .......... | B62D 5/0463 |
| JP | 2006273061 A | * | 10/2006 | | |
| JP | 2010105457 A | * | 5/2010 | | |
| JP | 5293088 B2 | * | 9/2013 | | |
| JP | 5444992 B2 | * | 3/2014 | .......... | B62D 5/0481 |
| JP | 2014156138 A | * | 8/2014 | .......... | B62D 5/0481 |
| JP | 2015013541 A | * | 1/2015 | .......... | B62D 5/0475 |
| JP | 2015033212 A | * | 2/2015 | .......... | B62D 5/0484 |
| JP | 2015074403 A | * | 4/2015 | .......... | B62D 5/0481 |
| JP | WO2013140906 A1 | * | 8/2015 | .......... | B62D 5/0487 |
| JP | WO2014184888 A1 | * | 2/2017 | .......... | B62D 5/0481 |
| JP | 6286149 B2 | * | 2/2018 | .......... | B62D 5/0484 |
| JP | 2020031495 A | * | 2/2020 | | |
| WO | WO-2006121144 A1 | * | 11/2006 | ............. | B60L 50/61 |
| WO | WO-2015015878 A1 | * | 2/2015 | .......... | B62D 5/0484 |
| WO | WO-2022243187 A1 | * | 11/2022 | .......... | B62D 5/0484 |

* cited by examiner

METHOD FOR DECELERATING A SERVOMOTOR OF A STEERING DEVICE

This application claims priority under 35 U.S.C. § 119 to patent application no. DE 10 2023 206 141.4, filed on Jun. 29, 2023 in Germany, the disclosure of which is incorporated herein by reference in its entirety.

The disclosure relates to a method for decelerating a servomotor of a steering device and a corresponding steering device. The disclosure also relates to a vehicle with such a steering device.

BACKGROUND

During maintenance work and/or repairs in automotive workshops, vehicle wheels may be accelerated manually and energy generated by the acceleration and/or stored in a steering system of the vehicle may be abruptly dissipated in a mechanical end stop or, in the case of steering systems without end stops, directly at the transmission-side assemblies of the steering system, which can lead to damage to the steering system. To make matters worse, an ignition and/or an operating switch of the vehicles is usually switched off during such maintenance work and/or repairs, whereby control units and/or control devices of the vehicle are put into a special idle state and/or standby state to reduce energy consumption and consequently the acceleration of the vehicle wheels caused by the external force is not recognized by the control units and/or control devices themselves or is recognized too late.

For this reason, DE 10 2017 218 830 A1, for example, proposes a method for decelerating a servomotor of a steering device, wherein the steering device comprises a control unit for controlling the servomotor and monitoring electronics for monitoring a movement of the servomotor, wherein a movement of the servomotor caused by an external force is monitored by means of the monitoring electronics by evaluating a movement parameter correlated with the movement of the servomotor and a deceleration process is triggered in at least one operating state as a function of the movement parameter, in which the servomotor is decelerated by means of the control unit. In addition, a voltage generated by the movement of the servomotor and/or an energy store that is different from a vehicle battery can be used to supply power to the monitoring electronics. In this case, however, the voltage generated by the movement of the servomotor or the energy store is only used to supply power to the monitoring electronics for a short time and therefore at least not to supply power to the control unit or the control unit and the monitoring electronics, so that no effective deceleration of the servomotor can be achieved by means of the aforementioned voltage or the energy store, for example in the event of a disconnected vehicle battery.

Based on this, the task of the disclosure is in particular to provide a method for decelerating a servomotor of a steering device as well as a steering device with improved properties with regard to a mode of operation. The problem is solved by the features disclosed herein.

SUMMARY

A method is proposed for decelerating a servomotor of a steering device, in particular for protection in a maintenance operating situation, wherein the steering device comprises a control unit for actuating the servomotor, monitoring electronics for monitoring a movement of the servomotor, and an energy store which is operatively connected to the control unit and the monitoring electronics and is designed differently from a vehicle battery, wherein a movement of the servomotor caused by an external force is monitored by means of the monitoring electronics by evaluating a movement parameter correlated with the movement of the servomotor and a deceleration process is triggered in at least one operating state as a function of the movement parameter, in which deceleration process the servomotor is decelerated by means of the control unit, in particular braked and advantageously completely decelerated, and wherein the energy store is charged by the movement of the servomotor, in particular a voltage generated by the movement and/or a current generated by the movement, and in at least one application case is used to supply energy to the control unit and the monitoring electronics. The energy store can be used, for example, to supply power to the control unit and the monitoring electronics if a power supply from the vehicle battery is interrupted, for example if the vehicle battery is disconnected, or is disrupted, for example due to a fault and/or defect in the vehicle battery and/or a peripheral module connected to the vehicle battery. This design can improve functionality in particular. In addition, effective deceleration of the servomotor can be achieved even if the vehicle battery is disconnected. In addition, effective and efficient protection of the mechanics and electronics of the steering device can be achieved, particularly in a maintenance situation, especially in vehicles and/or steering devices without end-stop dampers.

In particular, the steering device is intended to carry out the procedure for decelerating the servomotor. The term "provided" is understood in particular as meaning specifically programmed, designed and/or equipped. In particular, the phrase "an object being provided for a specific function" is intended to mean that the object fulfills and/or performs this specific function in at least one application—and/or operating state.

It is also proposed that the energy store is arranged in an intermediate circuit between the vehicle battery and the power electronics of the steering device. This makes it possible to achieve a particularly simple design in which the energy store is charged by the movement of the servomotor.

According to a particularly preferred embodiment, it is proposed that an intermediate circuit capacitance, i.e., in particular an existing capacitance of the steering device, which is also used in a normal operating state, is used as energy storage. The intermediate circuit capacitance can in particular comprise a single intermediate circuit capacitor or several intermediate circuit capacitors. In the latter case, the DC link capacitors can then work together as an energy store. This makes it possible to provide a particularly cost-efficient solution.

According to an alternative embodiment, it is proposed that the energy store is arranged in parallel with an intermediate circuit capacitance, i.e., in particular an existing capacitance of the steering device, which is also used in a normal operating state, and is switched on in the application, in particular via a switching unit, preferably in the form of a transistor. The energy store is advantageously designed as a capacitor. This makes it possible to provide a particularly flexible and/or adaptive solution.

In this application, the DC link capacity and the energy store can be provided together to supply power to the control unit and the monitoring electronics. Preferably, however, it is proposed that the DC link capacitance is decoupled in the application, in particular from the DC link. Decoupling can be achieved, for example, via the aforementioned switching unit, in particular by switching between the intermediate circuit capacitance and the energy store, or via a further switching unit, preferably in the form of a transistor, which is designed differently from the switching unit. In particular, this helps to avoid possible interference.

The method for decelerating the servomotor, the steering device, and the vehicle are not intended to be limited to the application and embodiment described above. In particular, the method for decelerating the servomotor, the steering device, and the vehicle may have a number of individual elements, components, and units other than a number specified herein in order to fulfill a mode of operation described herein.

BRIEF DESCRIPTION OF THE DRAWINGS

Further advantages follow from the description of the drawings hereinafter. The drawings show exemplary embodiments of the disclosure.

Shown are.

DETAILED DESCRIPTION

Figure 1A:
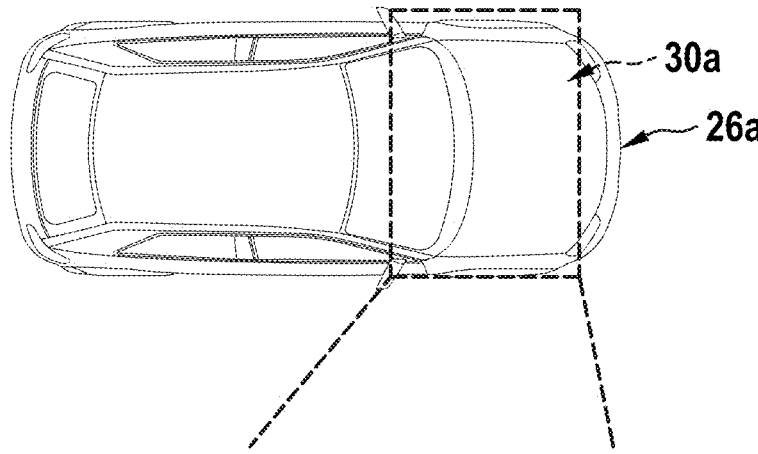
FIGS. 1*a* and 1*b* a simplified representation of an exemplary vehicle with a steering system comprising a steering device, FIG. 2 a schematic representation of part of the steering device, FIG. 3 an exemplary flow chart with main method steps of a method for decelerating a servomotor of the steering device, and FIG. 4 a schematic representation of another exemplary embodiment of a steering device.
Figure 1B:
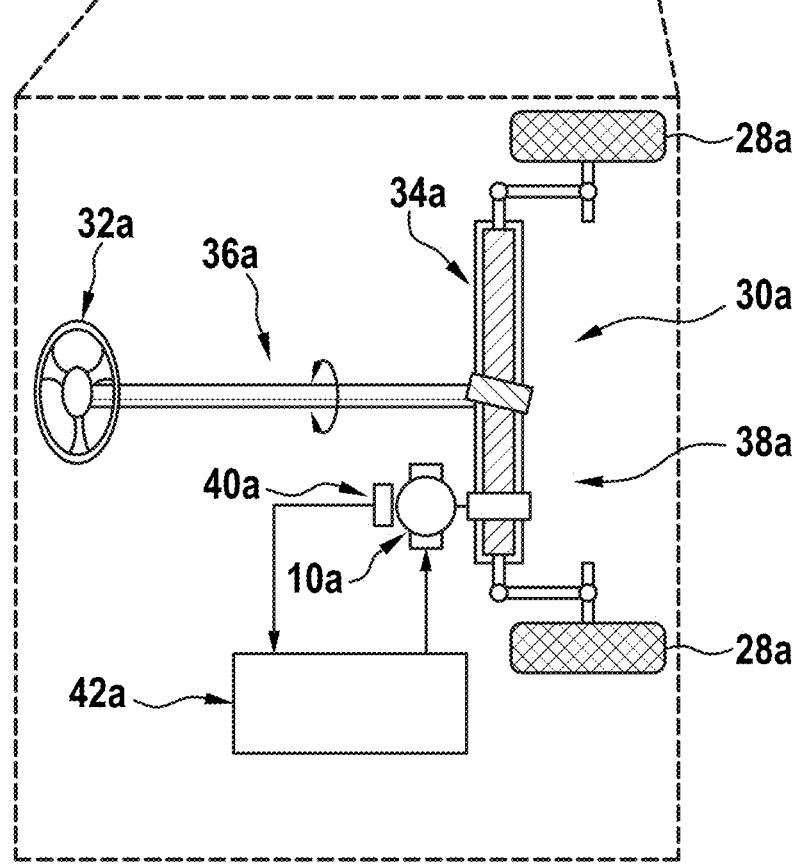

FIGS. 1*a* and 1*b* show an exemplary vehicle 26*a* designed as a motor vehicle with a plurality of vehicle wheels 28*a* and with a steering system 30*a* in a simplified representation. The steering system 30*a* has an operative connection with the vehicle wheels 28*a* and is intended to influence a direction of travel of the vehicle 26*a*. Furthermore, the steering system 30*a* is designed as an electrically assisted steering system and has an electric power steering system in the form of power steering. In principle, however, it is also conceivable to design a steering system as a hydraulically assisted steering system. A steering system could also be designed as a steer-by-wire steering system.

The steering system 30*a* comprises a steering device. Apart from an energy store 18*a* and/or a corresponding circuit of the energy store 18*a*, the steering device is essentially identical to the steering device disclosed in DE 10 2017 218 830 A1, so that explicit reference is also made to the description of DE 10 2017 218 830 A1.

The steering device comprises a steering wheel 32*a* for applying a manual steering torque, a steering gear 34*a* which is designed, for example, as a rack-and-pinion steering gear and is intended to convert a steering input, in particular at the steering wheel 32*a*, into a steering movement of the vehicle wheels 28*a*, which in the present case are designed in particular as front wheels, and a steering column 36*a* for connecting the steering wheel 32*a* to the steering gear 34*a*, in particular mechanically. Alternatively, a steering wheel could also be designed as a steering lever and/or steering ball or similar. It is also conceivable to dispense with a steering wheel altogether. In addition, a steering column could also only temporarily connect a steering wheel to a steering gear and/or have a mechanical separation, such as in a steer-by-wire steering system.

Furthermore, the steering device comprises an assistance unit 38*a*, in particular an electric assistance unit. The assistance unit 38*a* is intended to introduce a steering torque into the steering gear 34*a*, in the present case in particular in the form of an assistance torque. For this purpose, the support unit 38*a* comprises a servomotor 10*a*, which in the present case is designed in particular as an electric motor. The servomotor 10*a* is designed as a multiphase, in this case exemplarily three-phase, electric motor. Alternatively, a servomotor could also be part of a steering actuator, for example when a steering system is designed as a steer-by-wire steering system.

Furthermore, the steering device has a movement detection unit 40*a*, in this case in the form of a rotor position sensor. The motion detection unit 40*a* is arranged in a region of the servomotor 10*a* and is provided for detecting a movement of the servomotor 10*a*, in particular without contact. In addition, the movement detection unit 40*a* is intended to detect a detection signal correlated with the movement of the servomotor 10*a* and to provide it as a movement parameter.

In addition, the steering device has a control unit 42*a*. The control unit 42*a* has an active connection with the motion detection unit 40*a* and with the support unit 38*a*. The control unit 42*a* is intended to receive the movement parameter from the movement detection unit 40*a*. In addition, the control unit 42*a* is intended to control the servomotor 10*a*.

Figure 2:
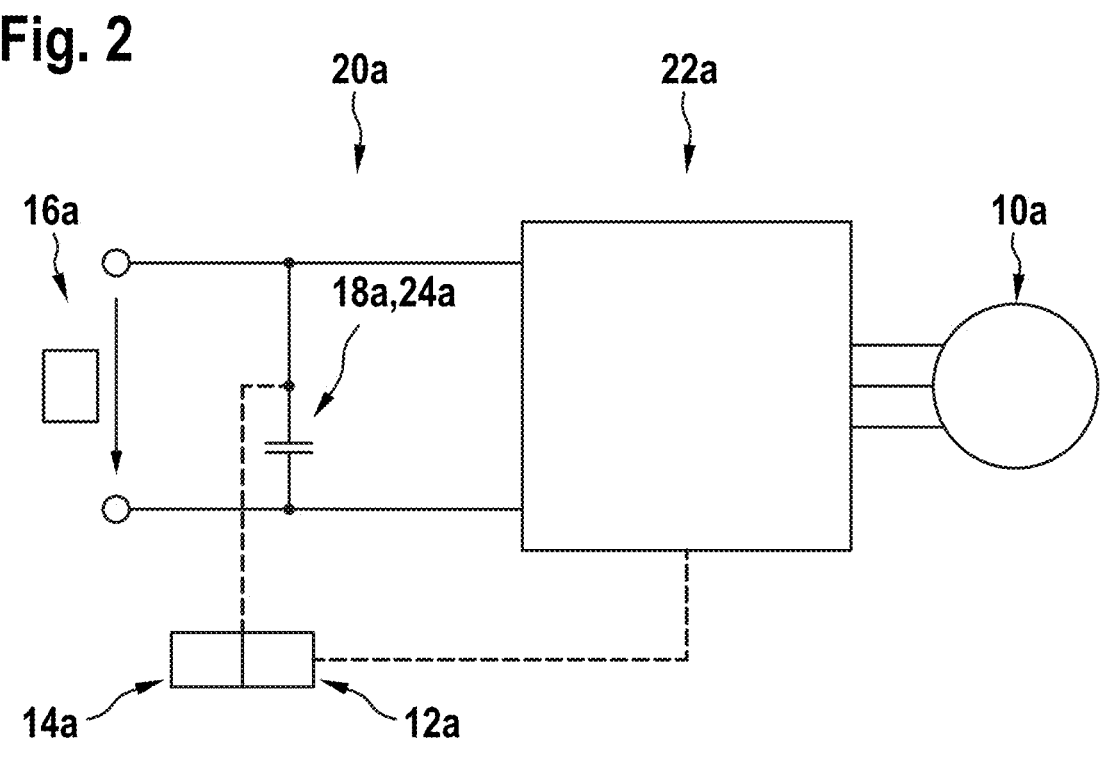

For this purpose, the control unit 42*a* comprises a control unit 12*a* known per se (see FIG. 2). The control unit 12*a* comprises at least one processor (not shown), for example in the form of a microprocessor, and at least one operating memory (not shown). In addition, in the present case the control unit 12*a* has at least two different operating modes, in particular a normal operating mode and a deceleration operating mode. The control unit 12*a* is intended to control the servomotor 10*a*. In the present case, the control unit 12*a* is provided in the normal operating mode for setting the assistance torque and in the deceleration operating mode for deceleration and advantageously for braking the servomotor 10*a*. Alternatively, a control unit could also be arranged in a central vehicle control unit.

In addition, the control unit 42*a* comprises power electronics 22*a* known per se, for example in the form of an output stage (see FIG. 2). The power electronics 22*a* has an active connection with the control unit 12*a* and is connected downstream of it in terms of control technology. In addition, the power electronics 22*a* has an active connection with the servomotor 10*a*. The power electronics 22*a* are intended to operate the servomotor 10*a* in a manner known per se. In principle, however, power electronics could also be designed separately and/or separately from a control unit.

Furthermore, the control unit 42*a* comprises monitoring electronics 14*a*, in particular separate from the control unit 12*a* (see FIG. 2). The monitoring electronics 14*a* is designed as an application-specific integrated circuit (ASIC). The monitoring electronics 14*a* has an active connection with the movement detection unit 40*a* and the control unit 12*a* and is intended to receive the movement parameter from the movement detection unit 40, continuously evaluate it, and thereby monitor a movement of the servomotor 10*a*. Alternatively, monitoring electronics could also be integrated into a control unit, wherein the monitoring electronics are advantageously designed as a separate logical unit. It is also conceivable to arrange monitoring electronics in a central vehicle control unit.

The steering device also has a vehicle battery 16*a* to supply power to the steering device, i.e., in particular to the control unit 12*a*, the monitoring electronics 14*a*, and the power electronics 22*a*. In the present case, the vehicle battery 16a is intended to supply the steering device and, in particular, the control unit 12a, the monitoring electronics 14a, and the power electronics 22a with energy, at least in a normal operating state.

With regard to further details concerning the design of the steering device, in particular the control unit 42a, reference is made to DE 10 2017 218 830 A1, to the disclosure of which explicit reference is made here.

In certain situations, such as during maintenance work and/or repairs, it may now occur that the vehicle wheels 28a of the vehicle 26a are accelerated by hand, wherein such a movement is transmitted to the steering gear 34a and the servomotor 10a. Such situations are particularly critical in a state in which the control unit 12a and/or other components of the steering device are at least partially inactive and/or are in a sleep mode, particularly an energy-saving mode. Particularly when the vehicle battery 16a is disconnected, no corresponding deceleration of the servomotor 10a can be achieved using the methods known from the prior art, which can lead to damage, especially in the case of steering devices without end stop dampers.

For this reason, the steering device in the present case comprises an, in particular additional, energy store 18a. The energy store 18a is different from the vehicle battery 16a. The energy store 18a has an electrical connection to the power electronics 22a and consequently to the servomotor 10a. In the present case, the energy store 18a is arranged in an intermediate circuit 20a between the vehicle battery 16a and the power electronics 22a. In addition, the energy store 18a has an electrical connection with the control unit 12a and the monitoring electronics 14a. Furthermore, the energy store 18a is designed as a capacitor. In the present case, the energy store 18a corresponds to an intermediate circuit capacity 24a of the steering device, i.e., in particular an existing capacity which is also used in the normal operating state. Alternatively, however, an energy store could also be designed separately from an intermediate circuit capacity. It is also conceivable to design an energy store as a buffer battery or similar.

The energy store 18a is intended to supply the control unit 12a and the monitoring electronics 14a with energy in at least one application. In the present case, the energy store 18a is provided at least for supplying power to the control unit 12a and the monitoring electronics 14a when a power supply from the at least one vehicle battery 16a is interrupted or disrupted, such as in a maintenance operating situation and when the vehicle battery 16a is disconnected.

For this reason, the energy store 18a is arranged and configured such that the energy store 18a can be charged even when the vehicle battery 16a is disconnected and/or in the event of a fault in the vehicle battery 16a. In the present case, the energy store 18a is charged directly by the movement of the servomotor 10a, in particular a voltage generated by the movement and/or a current generated by the movement. This makes it possible to achieve an effective deceleration of the servomotor 10a even when the vehicle battery 16a is disconnected. In addition, effective and efficient protection can be achieved in a maintenance situation, especially for steering devices without end-stop dampers.

Figure 3:
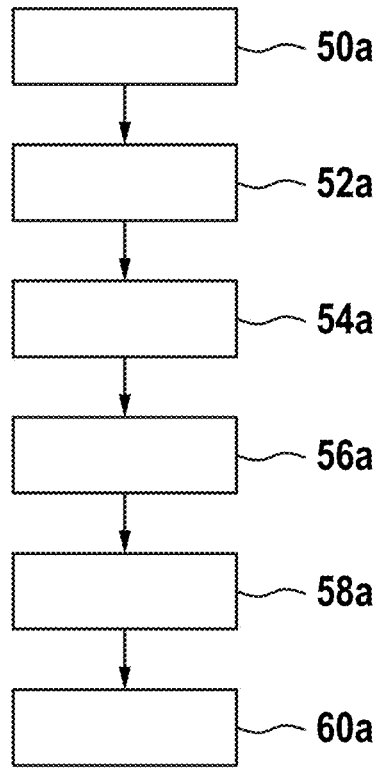

FIG. 3 shows an exemplary flow chart with main method steps of a corresponding method for decelerating the servomotor 10a, in particular in the event that a power supply from the at least one vehicle battery 16a is interrupted, for example when the vehicle battery 16a is disconnected, or is disrupted, for example due to a fault and/or a defect in the vehicle battery 16a and/or a peripheral module connected to the vehicle battery 16a.

In a method step 50a, a movement of the servomotor 10a caused by an external force, such as a manual movement of a vehicle wheel 28a in a maintenance mode situation, takes place.

In a method step 52a, the energy store 18a is charged by the movement of the servomotor 10a, in particular a voltage generated by the movement and/or a current generated by the movement. If the energy or the voltage and/or the current of the energy store device 18a reaches a corresponding limit value, the energy or the voltage and/or the current is sufficient to supply the monitoring electronics 14a and the monitoring electronics 14a is activated, by means of which the movement parameter is then monitored.

In a method step 54a, the monitoring electronics 14a checks whether the movement parameter is above a threshold value or below the threshold value. If the movement parameter is above the threshold value, a method step 56a follows.

In method step 56a, the monitoring electronics 14a trigger the deceleration process by activating, in particular activating and/or waking up, the control unit 12a, thereby placing it in the deceleration operating mode. The control unit 12a is then intended to cause a deceleration of the servomotor 10a, in particular an active or passive deceleration, by activating the power electronics 22a. Energy is also supplied to the control unit 12a and the power electronics 22a by the energy store 18a.

In a method step 58a, the control unit 12a and/or the monitoring electronics 14a check whether the movement parameter is above a further threshold value or below the further threshold value. If the movement parameter is above the further threshold value, method step 56a follows again. However, if the movement parameter is below the further threshold value, a method step 60a follows. In principle, the additional threshold value can also be identical to the threshold value.

The deceleration process is terminated in method step 60a. The control unit 12a then returns to the idle state depending on the movement parameter and/or an activation duration.

With regard to further details concerning the method for decelerating the servomotor 10a, reference is also made to DE 10 2017 218 830 A1, to the disclosure of which explicit reference is made here.

However, the exemplary flow chart in FIG. 3 is only intended to describe an exemplary method for decelerating the servomotor 10a. In particular, individual method steps can also vary. Further optional procedural steps could also be added.

Figure 4:
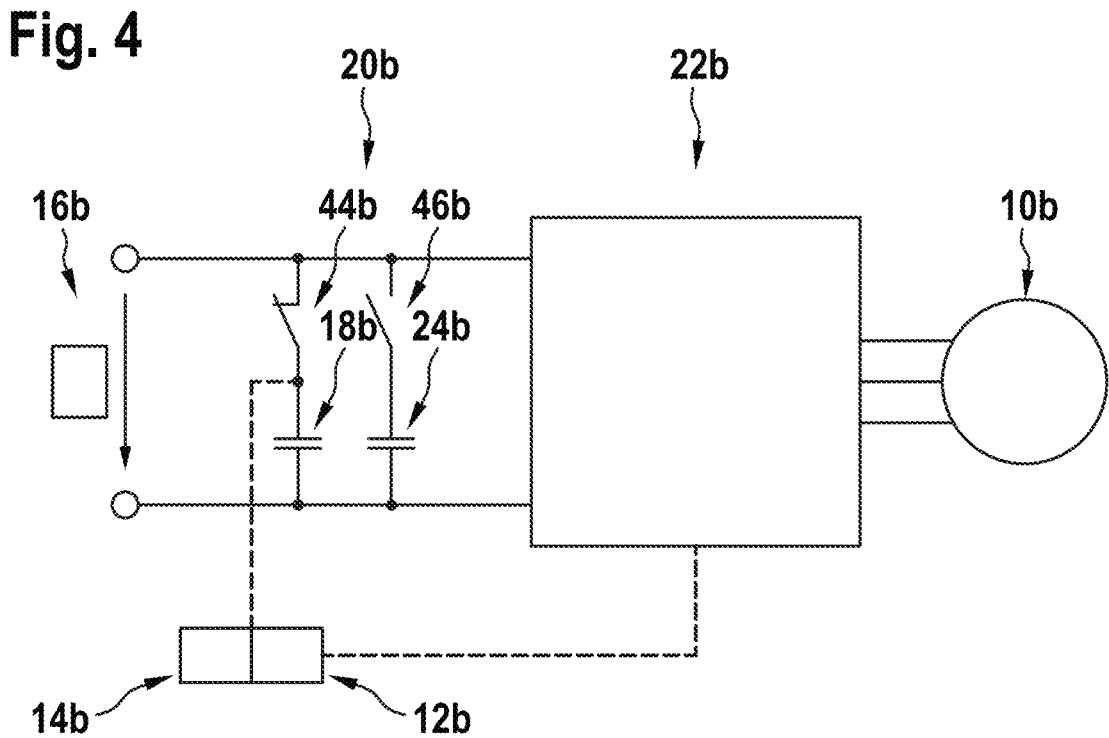

FIG. 4 shows a further exemplary embodiment of the disclosure. The following description and the drawing are essentially limited to the differences between the exemplary embodiments, wherein reference can also be made in principle to the drawings and/or the description of the other exemplary embodiment, in particular FIGS. 1a to 3, with regard to components with the same designation, in particular with regard to components with the same reference symbols. To differentiate between the exemplary embodiments, the letter a is placed after the reference signs of the exemplary embodiment in FIGS. 1a to 3. In the exemplary embodiment in FIG. 4, the letter a is replaced by the letter b.

In this case, an energy store 18b of the steering device is arranged parallel to an intermediate circuit capacitance 24b of the steering device. The energy store 18b is designed as a capacitor. In addition, the energy store unit 18b is switched on in at least one application, i.e., in particular when a power supply from a vehicle battery 16*b* is interrupted or disrupted, and is therefore electrically connected to an intermediate circuit 20*b*. For this purpose, the steering device comprises a switching unit 44*b*. The switching unit 44*b* can be supplied with energy either via a separate additional energy store (not shown) and/or via the vehicle battery 16*b*. In the latter case, the energy store 18*b* can be switched on, for example, when the vehicle is parked and/or switched off.

In addition, the DC link capacitance 24*b* is decoupled from the DC link 20*b* in this application. For this purpose, the steering device comprises a further switching unit 46*b*. The further switching unit 46*b* can also be supplied with energy via the separate further energy store (not shown) and/or via the vehicle battery 16*b*. In principle, however, it is also conceivable to supply the additional switching unit 46*b* with energy via the energy store 18*b*. Alternatively, switching between the intermediate circuit capacitance 24*b* and the energy store 18*b* could also take place. In principle, it would also be possible to dispense with disconnecting the DC link capacitance 24*b*.

In principle, however, the energy store 18*b* is also charged in this exemplary embodiment by the movement of a servomotor 10*b* of the steering device and is used in at least one application case to supply energy to a control unit 12*b* of the steering device, to monitoring electronics 14*b* of the steering device, and to power electronics 22*b* of the steering device.

What is claimed is:

1. A method for decelerating a servomotor of a steering device, the steering device comprising a control unit for controlling the servomotor, monitoring electronics for monitoring a movement of the servomotor, and an energy store operatively connected to the control unit and the monitoring electronics, the energy store having a different configuration from at least one vehicle battery, the method comprising:

activating the energy store by applying an external force to the vehicle from outside the vehicle;

monitoring a movement of the servomotor caused by the external force by evaluating a movement parameter correlated with the movement of the servomotor; and in at least one operating state, triggering a deceleration process as a function of the movement parameter, in which deceleration process the servomotor is decelerated using the control unit, by activating and/or waking up the control unit, wherein the energy store is charged by the movement of the servomotor, and, in at least one application case, the energy store is used to supply energy to the control unit and the monitoring electronics.

2. The method according to claim 1, further comprising:

using the energy store to supply energy to the control unit and the monitoring electronics when an energy supply from the at least one vehicle battery is interrupted or disrupted.

3. The method according to claim 1, wherein the energy store is arranged in an intermediate circuit between the at least one vehicle battery and power electronics of the steering device.

4. The method according to claim 3, wherein an intermediate circuit capacitance is used as the energy store.

5. The method according to claim 3, wherein the energy store is arranged in parallel with an intermediate circuit capacitance and is connected in the at least one application case.

6. The method according to claim 5, wherein the energy store is configured as a capacitor.

7. The method according to claim 5, wherein a DC link capacitance is disconnected during the at least one application case.

8. The method according to claim 1, wherein the external force is a force applied to a wheel of the vehicle from outside of the vehicle.

9. A steering device, comprising:

a servomotor having a control unit configured to control the servomotor;

monitoring electronics configured to monitor a movement of the servomotor; and an energy store operatively connected to the control unit and the monitoring electronics, wherein the energy store is configured differently from at least one vehicle battery of a vehicle that includes the steering device, wherein the monitoring electronics are configured to monitor a movement of the servomotor caused by application of an external force to the vehicle from outside the vehicle by evaluating a movement parameter correlated with the movement of the servomotor, and wherein, in at least one operating state, the monitoring electronics are configured to trigger a deceleration process for decelerating the servomotor using the control unit, by activating and/or waking up the control unit, wherein the energy store is charged by the movement of the servomotor, and the energy store supplies the control unit and the monitoring electronics with energy.

10. A vehicle comprising a steering device according to claim 9.

11. The vehicle according to claim 9, wherein the external force is a force applied to a wheel of the vehicle from outside of the vehicle.

* * * * *